(12) United States Patent
Birge

(10) Patent No.: US 12,709,223 B1
(45) Date of Patent: Aug. 18, 2026

(54) VEHICULAR MULTI-DIRECTIONAL THERMAL CAMERA SYSTEM AND METHODS FOR CAPTURING RADIOMETRIC THERMOGRAPHY DATA OF A TARGET OBJECT FROM A MOVING VEHICLE

(71) Applicant: Dusty Layne Birge, Kearney, NE (US)

(72) Inventor: Dusty Layne Birge, Kearney, NE (US)

(73) Assignee: Fast Forward, Inc., Kearney, NE (US)

( * ) Notice: Subject to any disclaimer, the term of this patent is extended or adjusted under 35 U.S.C. 154(b) by 372 days.

(21) Appl. No.: 18/521,904

(22) Filed: Nov. 28, 2023

Related U.S. Application Data

(60) Provisional application No. 63/428,350, filed on Nov. 28, 2022.

(51) Int. Cl.

| | |
|---|---|
| ***B60R 1/30*** | (2022.01) |
| ***B60R 1/27*** | (2022.01) |
| ***B60R 11/04*** | (2006.01) |
| ***G01J 5/02*** | (2022.01) |
| ***G01J 5/04*** | (2006.01) |
| ***G01J 5/48*** | (2022.01) |
| ***G01N 25/72*** | (2006.01) |
| ***H04N 23/23*** | (2023.01) |
| *G01J 5/80* | (2022.01) |

(52) U.S. Cl.
CPC .................. *B60R 1/30* (2022.01); *B60R 1/27* (2022.01); *B60R 11/04* (2013.01); *G01J 5/025* (2013.01); *G01J 5/047* (2013.01); *G01J 5/485* (2022.01); *G01N 25/72* (2013.01); *H04N 23/23* (2023.01); *B60R 2300/105* (2013.01); *B60R 2300/302* (2013.01); *G01J 5/80* (2022.01)

(58) Field of Classification Search
CPC .. B60R 1/30; B60R 1/27; B60R 11/04; B60R 2300/105; B60R 2300/302; G01J 5/025; G01J 5/047; G01J 5/485; G01J 5/80; G01N 25/72; H04N 23/23
See application file for complete search history.

(56) References Cited

U.S. PATENT DOCUMENTS

| | | | | |
|---|---|---|---|---|
| 6,526,352 | B1 * | 2/2003 | Breed | G01S 19/071 701/470 |
| 12,166,961 | B2 * | 12/2024 | Tauber | H04N 17/002 |
| 2012/0221569 | A1 * | 8/2012 | Sato | G16Z 99/00 707/736 |
| 2017/0132480 | A1 * | 5/2017 | Han | B60R 11/04 |

(Continued)

FOREIGN PATENT DOCUMENTS

| | | | |
|---|---|---|---|
| CN | 108956640 A | * 12/2018 | G01R 31/1272 |

OTHER PUBLICATIONS

English Machine Translation of CN108956640A to Yang et al. (Year: 2018).*

*Primary Examiner* — Laura Martin
*Assistant Examiner* — Philip L Cotey
(74) *Attorney, Agent, or Firm* — Plager Schack LLP; Mark H. Plager; Stephen Hallberg

(57) ABSTRACT

A vehicular multi-directional thermal camera system are disclosed. The vehicular multi-directional thermal camera system utilizes a multi-directional radiometric thermal camera with multiple thermal cameras which is triggered automatically, thereby making image capture during motion of the vehicle possible by a single operator driving the vehicle.

15 Claims, 9 Drawing Sheets

(56) References Cited

U.S. PATENT DOCUMENTS

| | | | | |
|---|---|---|---|---|
| 2017/0336806 | A1* | 11/2017 | Blanc-Paques | G01R 29/085 |
| 2018/0147986 | A1* | 5/2018 | Chi | B60R 11/04 |
| 2018/0284758 | A1* | 10/2018 | Cella | G05B 19/4185 |
| 2019/0279012 | A1* | 9/2019 | Birge | G06V 20/17 |
| 2020/0275011 | A1* | 8/2020 | Casey | H04N 23/11 |
| 2021/0126582 | A1* | 4/2021 | Shue | H02S 50/15 |
| 2021/0258515 | A1* | 8/2021 | Rees | G01J 5/02 |

* cited by examiner

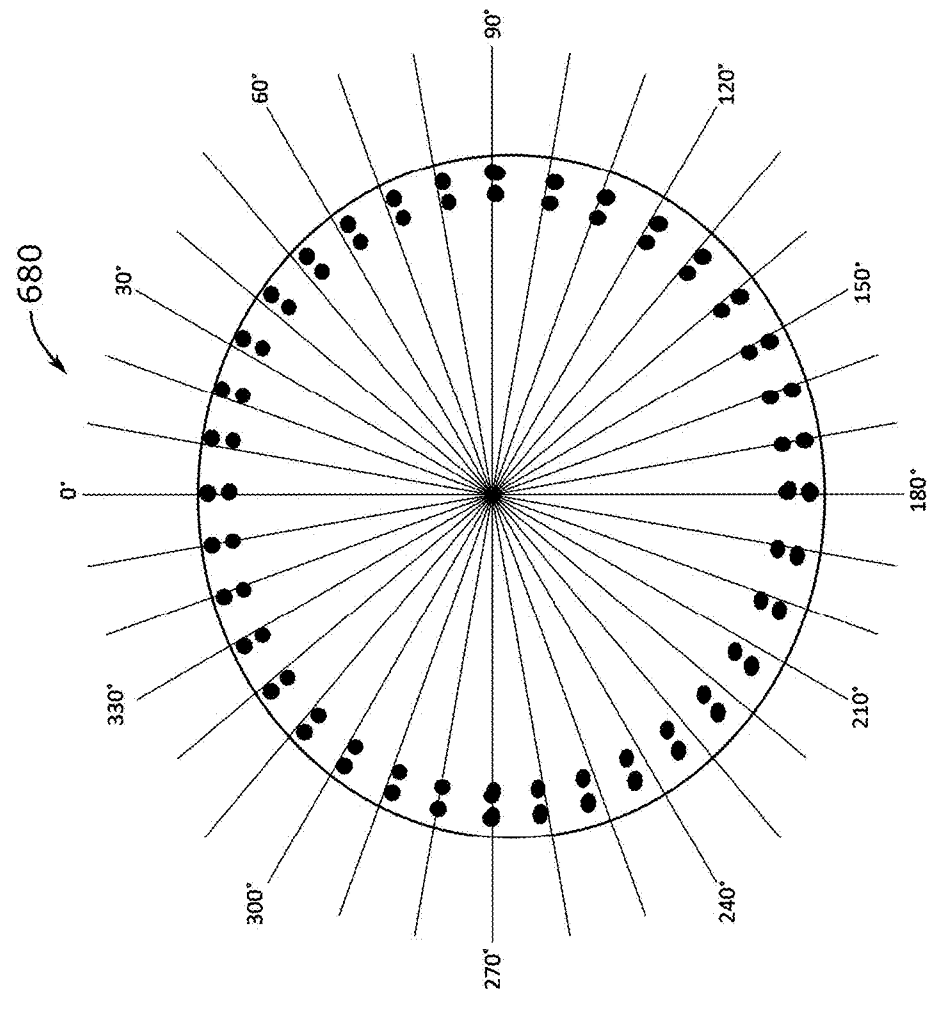
FIG.6
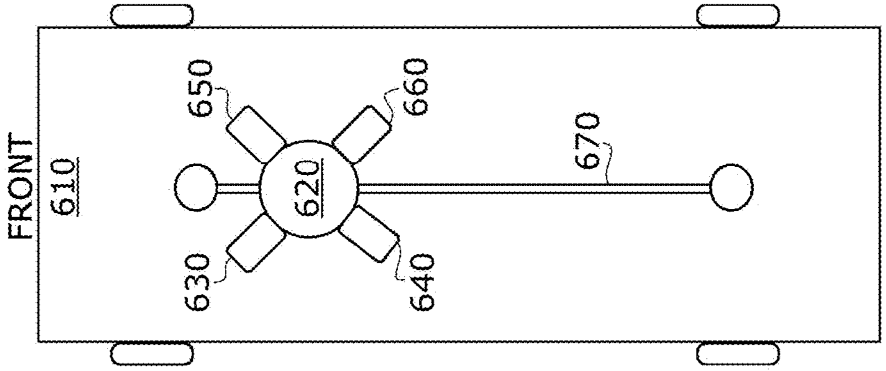

VEHICULAR MULTI-DIRECTIONAL THERMAL CAMERA SYSTEM AND METHODS FOR CAPTURING RADIOMETRIC THERMOGRAPHY DATA OF A TARGET OBJECT FROM A MOVING VEHICLE

CLAIM OF BENEFIT TO PRIOR APPLICATION

This application claims benefit to U.S. Provisional Patent Application 63/428,350, entitled "METHODS AND SYSTEMS FOR FACILITATING RADIOMETRIC THERMOGRAPHY DATA CAPTURE OF AN OBJECT USING A MULTI-DIRECTIONAL THERMAL CAMERA SYSTEM ON A MOVING VEHICLE," filed Nov. 28, 2022. The U.S. Provisional Patent Application 63/428,350 is incorporated herein by reference.

BACKGROUND

Embodiments of the invention described in this specification relate generally to radiometric thermographic data capture systems, and more particularly, to a vehicular multi-directional thermal camera system that is mounted on a moving vehicle and used to capture radiometric thermography data of a target object and a method for capturing radiometric thermography data of a target object from a moving vehicle.

There is currently no hardware and/or software that permits multi-directional radiometric thermography. In addition, such concepts are also not available on vehicles. In addition, such concepts are not built for data capture where the camera is in motion.

In industries that use inspectors for thermal data capture, the operator must physically hold each camera and trigger the camera at will. Each user can only operate one camera at a time, and is significantly limited to capturing data where they are currently standing. This limits the ability to capture a wider range of thermographic data.

Therefore, what is needed is a way to capture radiometric thermography data of one or more target object(s) while moving in a vehicle.

BRIEF DESCRIPTION

A novel vehicular multi-directional thermal camera system and methods for capturing radiometric thermography data of a target object from a moving vehicle are disclosed. In some embodiments, the vehicular multi-directional thermal camera system utilizes a plurality of radiometric thermal sensors (also referred to as the "individual radiometric cameras", "thermal cameras", or simply "cameras") and a computer vision system to process radiometric thermography data captured by the radiometric thermal sensors and prepare the radiometric thermography data into a multi-directional radiometric thermal data stream. In this way, the vehicular multi-directional thermal camera system enables radiometric thermography data to be captured from multiple directions while the vehicle is in motion.

In some embodiments, the vehicular multi-directional thermal camera system is mounted on a moving vehicle and used to capture radiometric thermography data of an object. In some embodiments, the vehicular multi-directional thermal camera system comprises a plurality of radiometric thermal sensor-based thermal cameras (hereinafter also referred to as "thermal cameras"), a global positioning system (GPS), and an in-vehicle electronic recording device.

In some embodiments, the vehicular multi-directional thermal camera system further comprises a plurality of multi-directional pan & tilt units. In some embodiments, each thermal camera is attached to a multi-directional pan & tilt unit. In some embodiments, the plurality of multi-directional pan & tilt units are mounted to a roof rack that is attached to a roof of the vehicle. In some embodiments, the vehicular multi-directional thermal camera system further comprises a network switch that communicably connects the in-vehicle electronic recording device to the GPS system, the plurality of thermal cameras, and the plurality of multi-directional pan & tilt units. In some embodiments, the in-vehicle electronic recording device of the vehicular multi-directional thermal camera system comprises an artificial intelligence (AI) engine that utilizes the computer vision system to process radiometric thermography data captured by the thermal cameras to identify anomalies in electrical infrastructure objects.

In some embodiments, the methods for capturing radiometric thermography data of a target object from a moving vehicle involve capturing radiometric thermography data of the target object by the plurality of thermal cameras and identifying a geospatial location of the target object by triangulating position based on multiple GPS locations of the moving vehicle and distance to the target object. In some embodiments, the methods for capturing radiometric thermography data of a target object from a moving vehicle using computer vision through AI processing by the AI engine to triangulate absolute GPS location of the target object. In some embodiments, the object is a target object. In some embodiments, the object is a target object detected in a plurality of images by way of computer vision system. In some embodiments, the object is a target object detected in a plurality of images by way processing performed by the AI engine.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
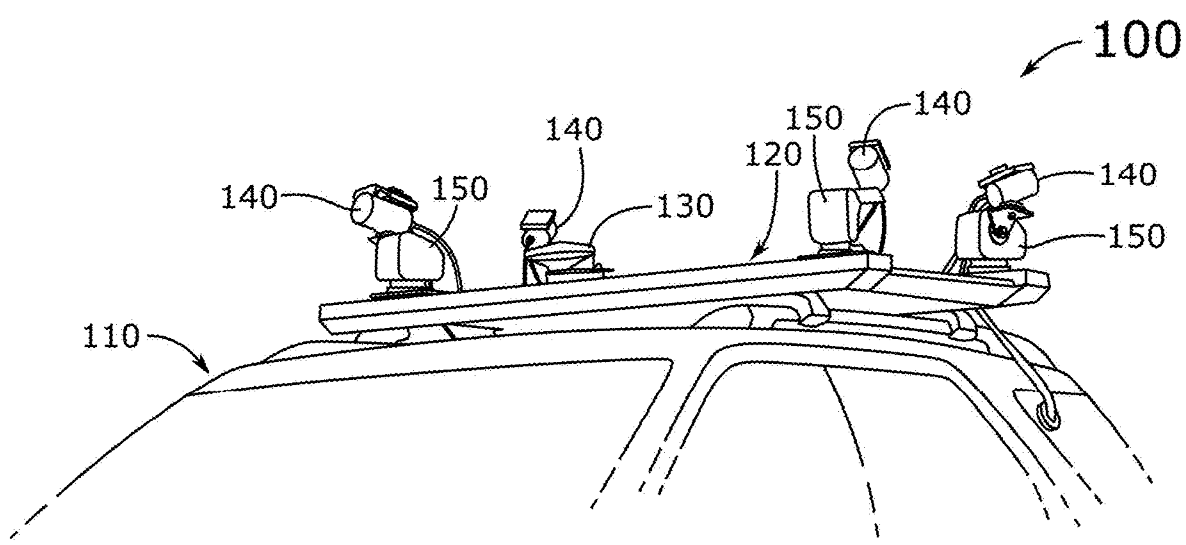

Having thus described the invention in general terms, reference is now made to the accompanying drawings, which are not necessarily drawn to scale, and which show different views of different example embodiments, and wherein:

FIG. 1 conceptually illustrates a vehicular multi-directional thermal camera system mounted to a vehicle roof in some embodiments.

Figure 2:
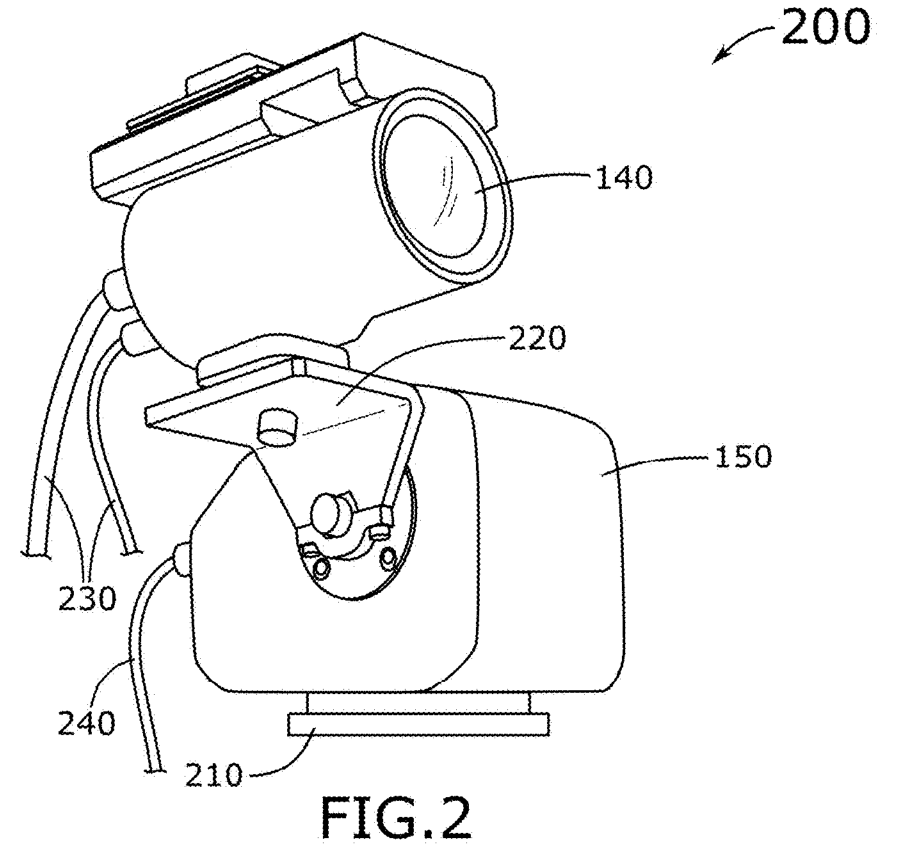

FIG. 2 conceptually illustrates a detail perspective view of a thermal camera attached to a pan and tilt unit (PTU) in some embodiments.

Figure 3:
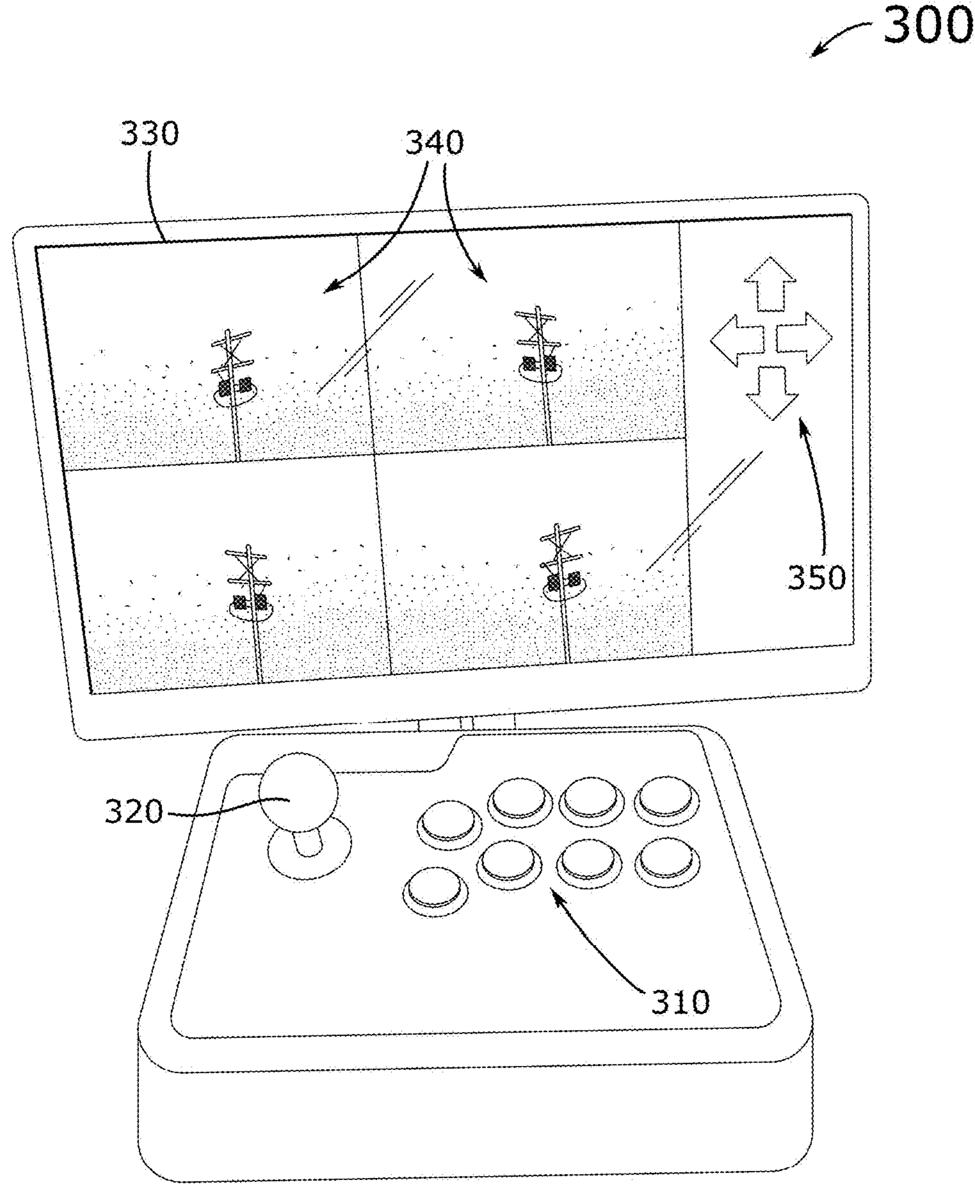

FIG. 3 conceptually illustrates a perspective view of an in-vehicle control and display computing device in some embodiments. (display screen 26 is a touchscreen, so a user can just use the touchscreen in lieu of the joystick and buttons-which are used to select which view/camera is being controlled)

Figure 4:
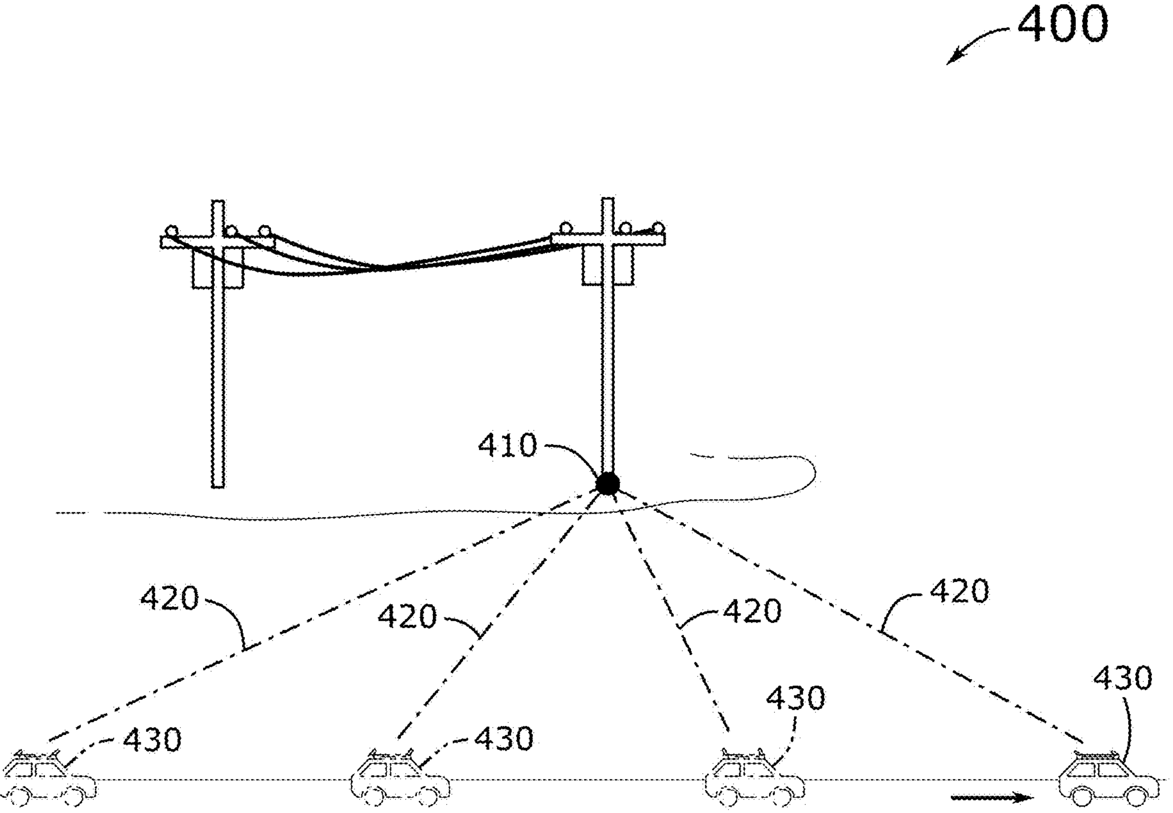

FIG. 4 conceptually illustrates a perspective view of a vehicular multi-directional thermal camera system mounted to a roof of a moving vehicle during use to estimate a GPS location of a base object in some embodiments.

Figure 5:
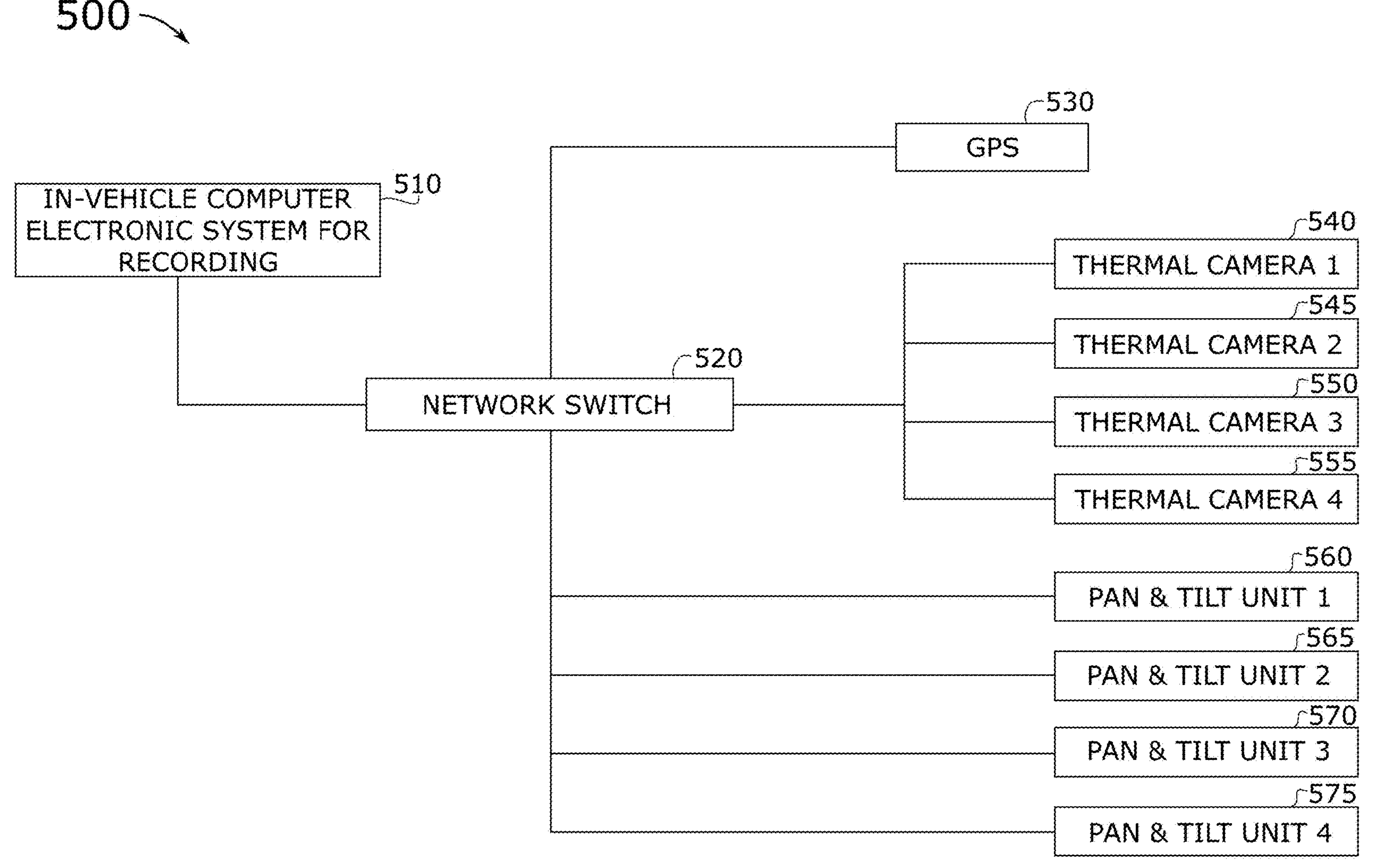

FIG. 5 conceptually illustrates a connection architecture of devices utilized in a vehicular multi-directional thermal camera system in some embodiments.

FIG. 6 conceptually illustrates a second vehicular multi-directional thermal camera system mounted to a track on a roof of a vehicle in an alternate embodiment.

Figure 7:
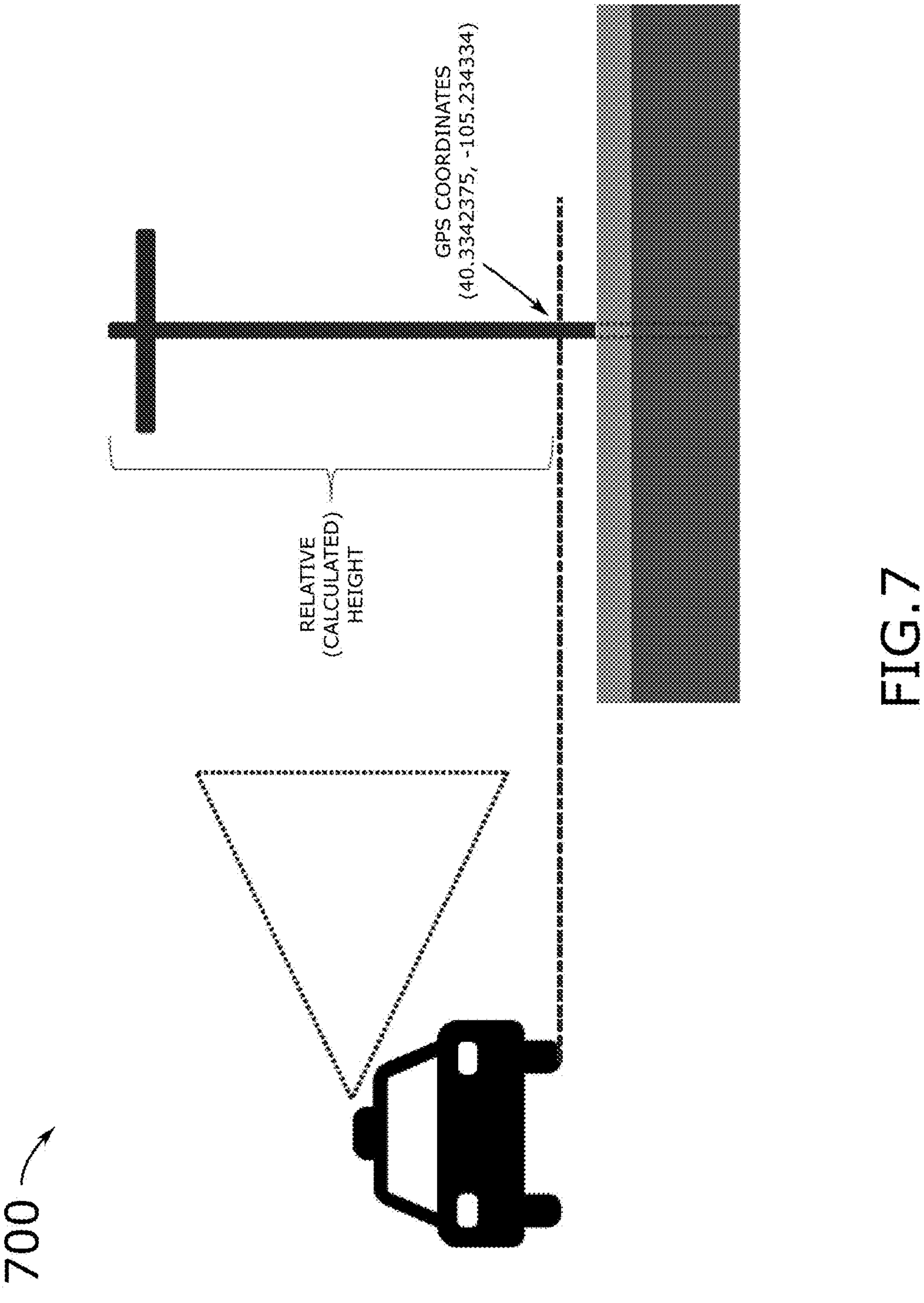

FIG. 7 conceptually illustrates an example of measuring and GPS calculation by the second vehicular multi-directional thermal camera system mounted to the track on the roof of the vehicle.

Figure 8:
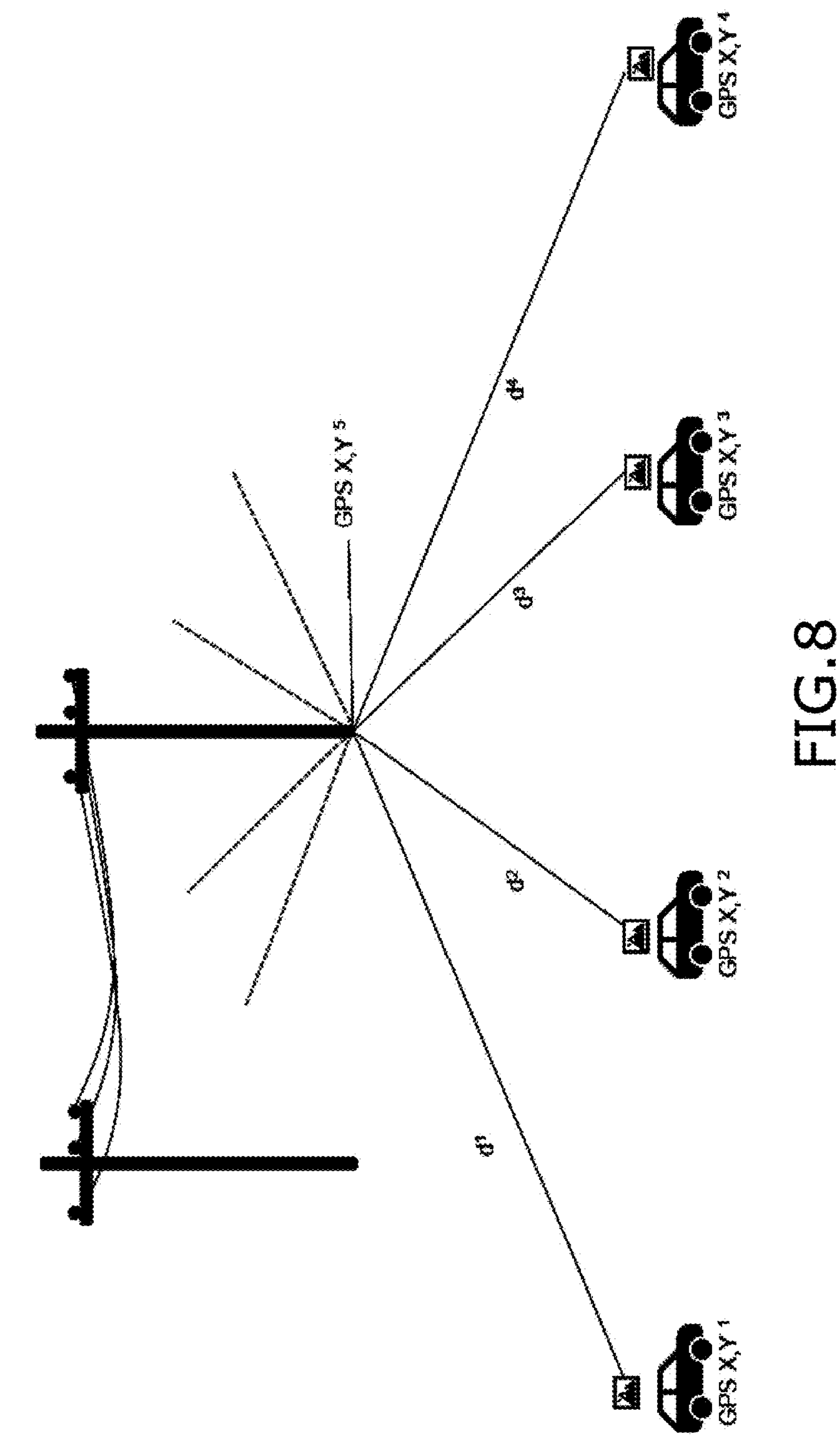

FIG. 8 conceptually illustrates a perspective view of the second vehicular multi-directional thermal camera system mounted to the track on the roof of a moving vehicle during use to estimate a GPS location of a base object in some embodiments.

Figure 9:
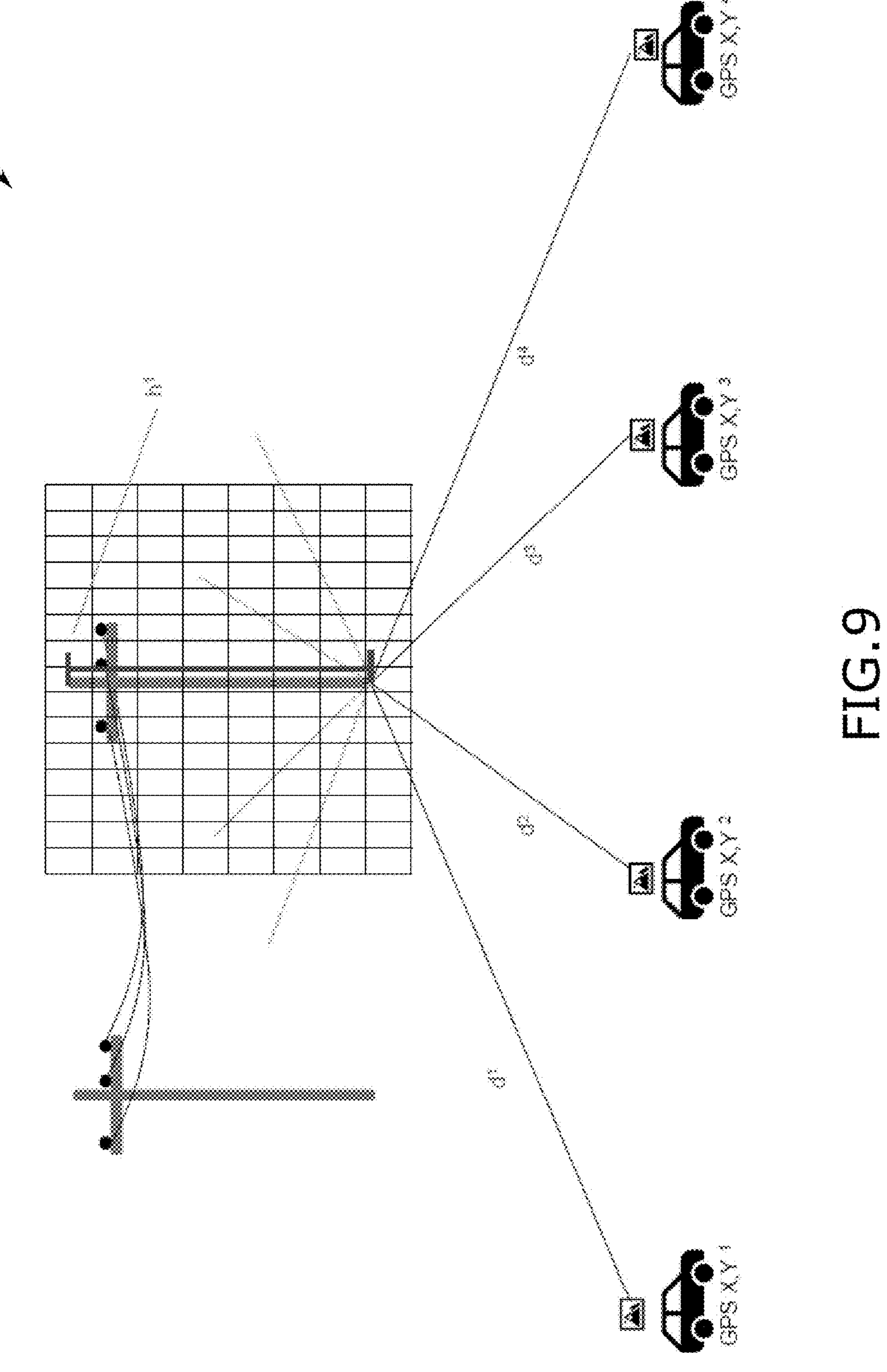

FIG. 9 conceptually illustrates a perspective view of the second vehicular multi-directional thermal camera system mounted to the track on the roof of a moving vehicle to measure the height to a target object based on distance to the object and a calculation of vertical pixels from the base object to the target object in some embodiments.

Figure 10:
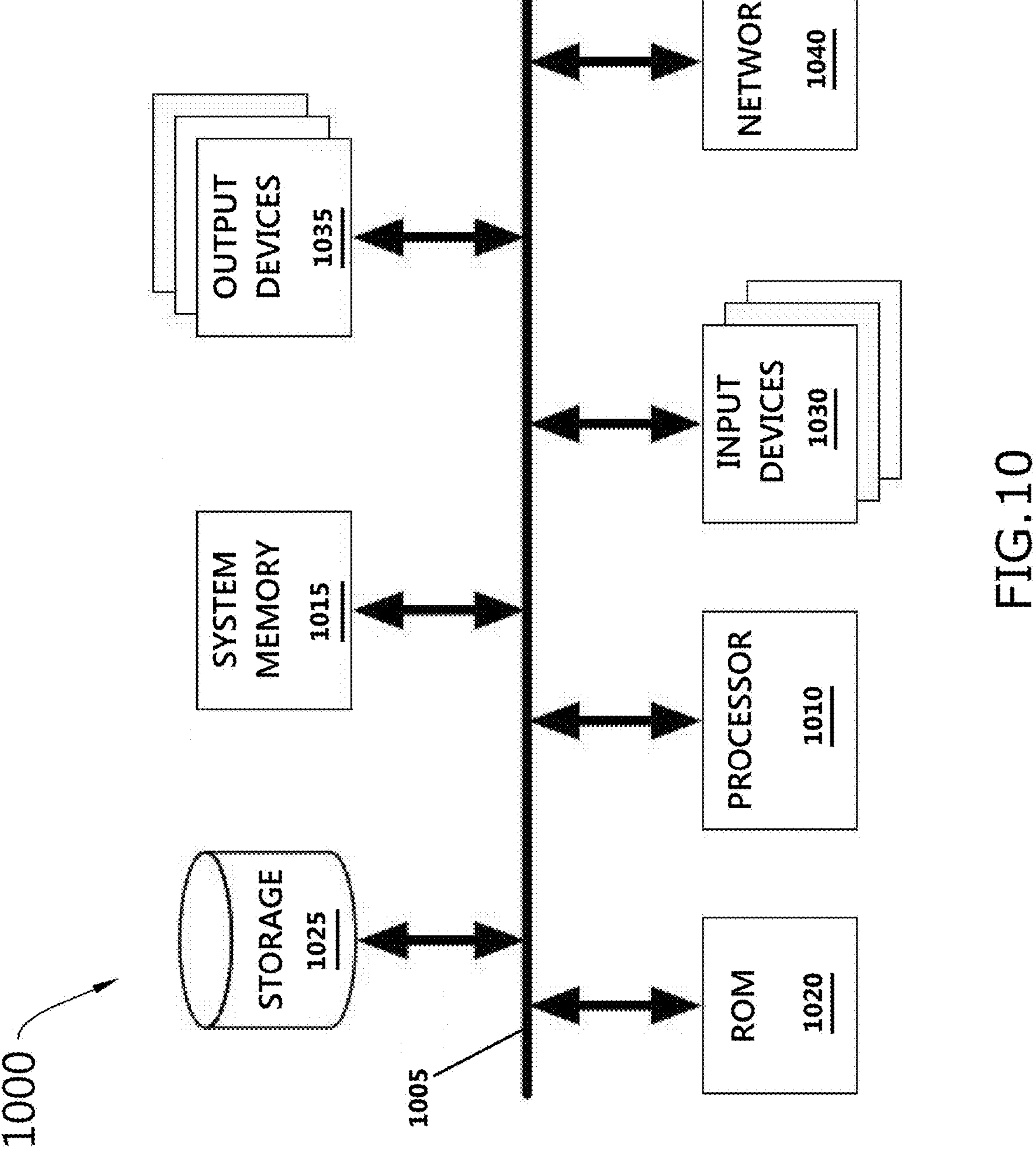

FIG. 10 conceptually illustrates an electronic system with which some embodiments of the invention are implemented.

DETAILED DESCRIPTION

In the following detailed description of the invention, numerous details, examples, and embodiments of the invention are described which provide unconventional systems and methods for capturing radiometric thermography data of electrical infrastructure objects from a moving vehicle. Embodiments consistent with the present disclosure are rooted in computer, camera, sensor, and global positioning system (GPS) technologies and may include capturing, storing, and/or processing various types of thermal data (including radiometric thermography data) from a moving vehicle, and may further include calculating and triangulating various types of positional data including GPS locations of target objects and relative height of electrical infrastructure objects. Capturing and processing radiometric thermography data from a moving vehicle according to the enclosed embodiments may lead to more efficient, effective, and accurate detection of electrical anomalies along power lines, power poles, and other electrical infrastructure objects, while calculating and triangulating GPS locations of target objects may lead to more precise identification of the locations of any detected electrical anomalies for service by electrical utilities. The unconventional systems and methods for capturing radiometric thermography data of electrical infrastructure objects from a moving vehicle in the disclosed embodiments may enable autonomous radiometric thermography data capture and precise location identification for electrical infrastructure inspections. For example, other than a driver of the vehicle, no operator is required to capture the radiometric thermography data because it is captured by multiple radiometric un-cooled thermal sensors (also referred to as the "thermal cameras") and absolute location of the target object is identified by a vehicular GPS system from which the location of the target object, at a distance from the vehicle, is calculated by triangulation techniques. However, it will be clear and apparent to one skilled in the art that the invention is not limited to the embodiments set forth and that the invention can be adapted for any of several applications.

As used herein, a moving vehicle may comprise a motor vehicle, a car, a truck, a motorcycle, an electric bicycle, a trailer attached to a road vehicle, aerial vehicles or drones, water vehicles, or any type of vehicle capable of motion including non-motor or electrically actuated vehicles such manual pedal bikes, manually operated vessels, etc.

Embodiments of a vehicular multi-directional thermal camera system and methods for capturing radiometric thermography data of a target object from a moving vehicle are described in this specification. In some embodiments, the vehicular multi-directional thermal camera system utilizes a plurality of radiometric thermal sensors and a computer vision system to process radiometric thermography data captured by the radiometric thermal sensors and prepare the radiometric thermography data into a multi-directional radiometric thermal data stream. In this way, the vehicular multi-directional thermal camera system enables radiometric thermography data to be captured from multiple directions while the vehicle is in motion.

In some embodiments, the vehicular multi-directional thermal camera system is mounted on a moving vehicle and used to capture radiometric thermography data of an object. In some embodiments, the vehicular multi-directional thermal camera system comprises a plurality of thermal cameras, a GPS system, and an in-vehicle electronic recording device. In some embodiments, the vehicular multi-directional thermal camera system further comprises a plurality of multi-directional pan & tilt units. In some embodiments, each thermal camera is attached to a multi-directional pan & tilt unit. In some embodiments, the plurality of multi-directional pan & tilt units are mounted to a roof rack that is attached to a roof of the vehicle. In some embodiments, the vehicular multi-directional thermal camera system further comprises a network switch that communicably connects the in-vehicle electronic recording device to the GPS system, the plurality of thermal cameras, and the plurality of multi-directional pan & tilt units. In some embodiments, the in-vehicle electronic recording device of the vehicular multi-directional thermal camera system comprises an artificial intelligence (AI) engine that utilizes the computer vision system to process radiometric thermography data captured by the thermal cameras to identify anomalies in electrical infrastructure objects.

In some embodiments, the plurality of thermal cameras are externally attached to a vehicle. In some embodiments, the plurality of thermal cameras are configured to capture radiometric thermography data of a target object while the vehicle is moving and transfer the captured radiometric thermography data of the target object to the in-vehicle electronic recording device in realtime.

In some embodiments, the internal, in-vehicle electronic recording device is configured to receive the captured radiometric thermography data from the plurality of thermal cameras. In some embodiments, the internal, in-vehicle electronic recording device is configured to control the plurality of thermal cameras. In some embodiments, the internal, in-vehicle electronic recording device is also configured to control the plurality of multi-directional pan & tilt units. In some embodiments, the in-vehicle electronic recording device comprises an electronic system computer.

In some embodiments, the methods for capturing radiometric thermography data of a target object from a moving vehicle involve capturing radiometric thermography data of the target object by the plurality of thermal cameras and identifying a geospatial location of the target object by triangulating position based on multiple GPS locations of the moving vehicle and distance to the target object. In some embodiments, the methods for capturing radiometric thermography data of a target object from a moving vehicle using computer vision through AI processing by the AI engine to triangulate absolute GPS location of the target object. In some embodiments, the object is a target object. In some embodiments, the object is a target object detected in a plurality of images by way of computer vision system. In some embodiments, the object is a target object detected in a plurality of images by way processing performed by the AI engine.

In some embodiments, a second vehicular multi-directional thermal camera system comprises a plurality of thermal cameras, a GPS, a multi-directional thermal camera base to which the plurality of thermal cameras and the GPS are attached, and an in-vehicle electronic recording device. In some embodiments, the second vehicular multi-directional thermal camera system further comprises a plurality of pan & tilt units to which the plurality of thermal cameras are mounted.

As stated above, there is currently no hardware and/or software that permits multi-directional radiometric thermography. In addition, such concepts are also not available on vehicles. In addition, such concepts are not built for data capture where the camera is in motion. In industries that use inspectors for thermal data capture, the operator must physically hold each camera and trigger the camera at will. Each user can only operate one camera at a time, and is significantly limited to capturing data where they are currently standing. This limits the ability to capture a wider range of thermographic data. Embodiments of the vehicular multi-directional thermal camera system described in this specification solve such problems by utilizing a plurality of radiometric thermal sensors (or plurality of cameras) for the multi-directional thermal camera, a GPS unit, and computer vision methods to process the collected thermography data into a multi-directional radiometric thermal data stream. The vehicular multi-directional thermal camera system enables thermography data to be captured from multiple directions while the camera is in motion. For example, the multi-directional thermal camera can be mounted on a car and utilized while traveling along the road without requiring an operator to stop to capture a photo. In some embodiments, the plurality of radiometric thermal sensors comprise four radiometric thermal sensors.

Embodiments of the vehicular multi-directional thermal camera system described in this specification differ from and improve upon currently existing options. In particular, some embodiments differ from existing options that are designed for non-movement usage. Specifically, a thermal camera is used to capture imagery only while in a stationary position, meaning if the operator is in a vehicle, the vehicle stops prior to a point-and-shoot action by the operator to capture the thermography data by the (or each, separate) camera. By contrast, the vehicular multi-directional thermal camera system described in this disclosure enables capturing data in multiple directions at the same time by a single operator while the vehicle of the operator is in motion. This is possible by utilization of a multi-directional radiometric thermal camera that is configured to be triggered automatically.

The vehicular multi-directional thermal camera system of the present disclosure may be comprised of the following elements. This list of possible constituent elements is intended to be exemplary only and it is not intended that this list be used to limit the vehicular multi-directional thermal camera system of the present application to just these elements. Persons having ordinary skill in the art relevant to the present disclosure may understand there to be equivalent elements that may be substituted within the present disclosure without changing the essential function or operation of the vehicular multi-directional thermal camera system.

1. Data capture by a vehicular multi-directional thermal camera system (with GPS unit, a temperature recording sensor, and a processing unit (CPU) of a computing device with connected data drive). The vehicular multi-directional thermal camera system is typically mounted on the moving vehicle.
2. Data processing by an artificial intelligence (AI), processing unit, and computer vision machine
3. Object locating via image triangulation as enabled by the GPS unit
4. Anomaly detection by the AI and processing unit The various elements of the vehicular multi-directional thermal camera system of the present disclosure may be related in the following exemplary fashion and functionally carried out by methods for capturing radiometric thermography data of a target object from a moving vehicle. It is not intended to limit the scope or nature of the relationships between the various elements or operations/steps of the methods for capturing radiometric thermography data of a target object from a moving vehicle, and the following examples are presented as illustrative examples only. The vehicular multi-directional thermal camera system uses multiple radiometric thermal cameras for data capture (at Step 1). The vehicular multi-directional thermal camera system has at least one GPS unit, a temperature recording sensor, and a processing unit (CPU) of a computing device that is performing real-time computing and recording of imagery to a data drive. After data capture and recording (storing) to the data drive, the data is transferred from the data drive to an AI/Computer vision machine which consolidates the data (at Step 2). Once the data has been geospatially aligned, the target objects are detected (at Step 3) and triangulation of the GPS coordinates is done for all the subsequent automated steps, thereby yielding "candidate imagery". The candidate imagery includes targeted inspection images that require inspection for anomalies. Once the candidate images are identified (at Step 3), the anomaly detection begins (at Step 4) which quantifies the severity and quantity of the issues identified that require repair or replacement by the client.

The vehicular multi-directional thermal camera system of the present disclosure generally works by driving down the road with the vehicular multi-directional thermal camera system operating automatically. That is, after being installed on top of a vehicle (e.g., an automobile), the system is powered on. System calibration steps are performed including IMU, CPU, GPS, and camera calibrations for each of the cameras of the vehicular multi-directional thermal camera system. This can all be done by a single person. After calibration, the user can then drive down the road and the vehicular multi-directional thermal camera system operates automatically. As such, the vehicular multi-directional thermal camera system captures imagery in multiple directions and in motion, not requiring stopping or intervention by the operator. Once the driving route is completed, the user completes a final calibration step and another step for a shutdown procedure. After final calibration and shut down, the data on the data drive is transferred to a computer vision system operating via a secure cloud environment. When an object is detected by the computer vision model, it then determines the best image for inspection needs. If no object is detected, the images are discarded.

To make the vehicular multi-directional thermal camera system of the present disclosure, a person would need to identify a plurality of cameras able to record data at a sufficient frame rate to permit recording of data in motion without buffering. In some embodiments, the plurality of cameras comprises four cameras capable of recording data at a minimum frame rate to allow for motion of the vehicle during recording. A central processing unit (CPU) would need to be built to control all active and passive processes.

By way of example, FIG. 1 conceptually illustrates a vehicular multi-directional thermal camera system 100. As shown in this figure, the vehicular multi-directional thermal camera system 100 is mounted to a roof rack 120 that is attached to a vehicle 110. The vehicular multi-directional thermal camera system 100 comprises a GPS system 130, a plurality of thermal cameras 140, and a plurality of pan & tilt units 150. Specifically, the vehicular multi-directional thermal camera system 100 is attached externally to the vehicle 110 so that the plurality of thermal cameras 140 can capture radiometric thermography data of a target object while the vehicle 110 is moving. In this figure, the plurality of thermal cameras 140 comprises four thermal cameras 140. Also, the plurality of thermal cameras 140 are mounted to the plurality of pan & tilt units 150. Accordingly, the plurality of pan & tilt units 150 comprises four pan & tilt units 150. Each pan & tilt unit 150 is configured to tilt vertically to orient a field of view of the corresponding thermal camera 140 (mounted to the pan & tilt unit 150) according to a focus point directed at the intended target of interest. Furthermore, each pan & tilt unit 150 comprises a swivel mount that provides three-hundred sixty degrees (360°) of angular rotation. The swivel mount and more details of the pan & tilt unit and the thermal camera are described next, by reference to FIG. 2.

Specifically, FIG. 2 conceptually illustrates a detail perspective view 200 of a thermal camera 140 attached to a pan & tilt unit 150. As shown in this figure, the pan & tilt unit 150 includes a swivel mount 210 that provides 360° of angular rotation for the pan & tilt unit 150 and the attached thermal camera 140. The thermal camera 140 is mounted to a bracket assembly 220 that is attached to a side of the pan & tilt unit 150. The bracket assembly 220 may include a bracket, a washer, and screws or other connectors. In some embodiments, the thermal camera 140 is mounted to a top side of the pan & tilt unit 150. When mounted to the top side of the pan & tilt unit 150, the bracket assembly 220 is not needed. Also shown in this figure are power, control, and data transmission wires 230 for the thermal camera 140 and a PTU power and control cable 240 for the pan & tilt unit 150. One end of the power, control, and data transmission wires 230 are connected to a back side of the thermal camera 140 (opposite a lens of the thermal camera 140). The other end of the power, control, and data transmission wires 230 are connected to a vehicle power source or battery (for power transmission to the thermal camera), and the in-vehicle electronic recording device (for control of the thermal camera and to receive thermography data from the thermal camera). Specifically, the control and data transmission wiring of the power, control, and data transmission wires 230 enables the thermal camera 140 to transmit the captured radiometric thermography data to the in-vehicle electronic recording device and to receive control data from the in-vehicle electronic recording device. The power wiring of the power, control, and data transmission wires 230 provide electrical current to the thermal camera 140 from a power source, such as the vehicle or a battery. In some embodiments, the thermal camera 140 is equipped with its own battery and need not draw electrical power through the power, control, and data transmission wires 230.

Similarly, the PTU power and control cable 240 enables the pan & tilt unit 150 to receive control data from the in-vehicle electronic recording device and electrical power from the power source (vehicle or external battery). Control data may be transmitted from the in-vehicle electronic recording device to the pan & tilt unit 150 over the PTU power and control cable 240 to change a vertical tilt of the pan & tilt unit 150 and, consequently, change the field of view of the thermal camera 140 up or down. Similarly, control data may be transmitted from the in-vehicle electronic recording device to the pan & tilt unit 150 over the PTU power and control cable 240 to change a swivel position of the swivel mount 210 and, consequently, rotationally pan the thermal camera 140 left or right, with up to 360° of angular rotational movement.

In some embodiments, the thermal camera 140 and the pan & tilt unit 150 are configured for wireless data communications. Examples of wireless data communications include, without limitation, Bluetooth, WiFi, cellular, etc. When the in-vehicle electronic recording device is also configured for wireless data communications, then the thermal camera 140 may send and receive wireless communications to and from the in-vehicle electronic recording device and the pan & tilt unit 150 may receive wireless command data from the in-vehicle electronic recording device. Specifically, wireless data communication enables the thermal camera 140 to wirelessly transmit the captured radiometric thermography data to the in-vehicle electronic recording device and to wirelessly receive control data from the in-vehicle electronic recording device. When the thermal camera 140 has its own battery for power and is configured for wireless data communications and the in-vehicle electronic recording device is also configured for wireless data communications, the power, control, and data transmission wires 230 may not be needed. However, the power, control, and data transmission wires 230 may be present even when wireless data communications between the thermal camera 140 and the in-vehicle electronic recording device is supported. For example, the existence of power, control, and data transmission wires 230 may provide a backup power source if the embedded battery of the thermal camera 140 expires or backup data communications in the event that the wireless communications is interrupted. Similarly, the pan & tilt unit 150 may include its own embedded battery. However, the PTU power and control cable 240 may still be equipped with the pan & tilt unit 150 to ensure that a backup power source is readily available in the event the embedded battery is drained. Furthermore, the vehicular multi-directional thermal camera system may be configured for hybrid wireless and wired data communications between the thermal camera 140 and the in-vehicle electronic recording device. An example of an in-vehicle control and display computing device (as one type of in-vehicle electronic recording device) is described next, by reference to FIG. 3.

In this example, FIG. 3 conceptually illustrates a perspective view of an in-vehicle control and display computing device 300. As shown in this figure, the in-vehicle control and display computing device 300 comprises a plurality of control buttons 310, a joystick 320, and a display screen 330. The display screen 330 is configured to visually output a field of view of each camera (view/camera) in the plurality of thermal cameras. The plurality of control buttons 310 are configured for view and control selection and are used to select which view/camera is being controlled and which pan & tilt unit is being controlled. The joystick 320 is configured to control the selected thermal camera and/or pan & tilt unit. For example, a selection of a view/camera would allow, for example, manipulation of the joystick 320 for zooming in or out by the corresponding thermal camera 140. Similarly, a selection of a view/camera would also allow, for example, manipulation of the joystick 320 for panning (rotationally left or right) and tilting (vertically up or down) of the corresponding pan & tilt unit 150 associated with the selected view/camera.

In some embodiments, the display screen 330 is a touchscreen. The display screen 330 shown in this figure is displaying a plurality of thermal images 340 and touchscreen display controls 350. The plurality of thermal images 340 demonstrate a current field of view of each of four thermal cameras as they operate to capture radiometric thermography data. The touchscreen display controls 350 enable operational control through the touchscreen in lieu of the joystick 320 and/or control buttons 310. While not shown in this figure, the wiring to the thermal camera 140 and the pan & tilt unit 150 (over the power, control, and data transmission wires 230 and the PTU power and control cable 240, respectively) may be connected to the in-vehicle control and display computing device 300.

By way of example, FIG. 4 conceptually illustrates a perspective view of a vehicular multi-directional thermal camera system 400 attached to a moving vehicle 430 and being used to estimate a GPS location 410 of a base object (power line pole). Specifically, the GPS location 410 is determined by triangulating the actual GPS position of the moving vehicle 430 (via its GPS system) and based on a relative distance 420 to the base object. The relative distance 420 to the base object is based on a known distance from the road to the base object and adjusted based on current position of the moving vehicle 430. The combination of the relative distance 420 with the location of the moving vehicle 430, calculated from GPS data received at various locations (at least two locations, but three or four location calculations provides more accurate results) along the vehicle's path of movement, is sufficient to triangulate the GPS location 410 of the base object.

In some embodiments, the thermal cameras of the vehicular multi-directional thermal camera system can be repositioned for different pitch/yaw directions to yield additional fields of view. Furthermore, the cameras for the vehicular multi-directional thermal camera system can be positioned at any point on the vehicle in a manner that their field of view is not obstructed.

To use the vehicular multi-directional thermal camera system of the present disclosure, a single person would operate the vehicle while the vehicular multi-directional thermal camera system automatically captures radiometric thermal imagery, while in motion and in multiple directions while driving down the road.

By way of example, FIG. 5 conceptually illustrates an architecture of devices utilized in a vehicular multi-directional thermal camera system 500. As shown in this figure, the devices of the vehicular multi-directional thermal camera system 500 include an in-vehicle computer electronic system 510 connected to a network switch 520, a GPS system 530, a plurality of thermal cameras 540-555, and a plurality of pan & tilt units 560-575. The in-vehicle computer electronic system 510 and the network switch 520 are devices that are typically placed inside the cabin of the moving vehicle, while the GPS system 530, the plurality of thermal cameras 540-555, and the plurality of pan & tilt units 560-575 are externally mounted to the moving vehicle (e.g., mounted to the roof rack 120 which is attached to the roof of the vehicle 110). The plurality of thermal cameras 540-555 comprise a first thermal camera 540, a second thermal camera 545, a third thermal camera 550, and a fourth thermal camera 555. The plurality of thermal cameras 540-555 are configured to capture radiometric thermography data when oriented toward a target object, such as electrical infrastructure objects. The GPS system 530 is configured to calculate multiple GPS locations of the moving vehicle along the path of movement of the moving vehicle. The multiple calculated GPS locations of the moving vehicle are used in connection with a relative distance to a base of the target object to establish an absolute GPS location of the target object. The plurality of pan & tilt units 560-575 are configured to orient the fields of view of the plurality of thermal cameras 540-555 by vertical tilting up and down and rotational panning left and right. The network switch 520 is configured to receive the radiometric thermography data captured by the plurality of thermal cameras 540-555 and provide the received radiometric thermography data to the in-vehicle computer electronic system 510 for recording, displaying (on the display screen/touchscreen), and additional processing. The network switch 520 is also configured to receive the calculated GPS locations of the moving vehicle from the GPS system 530 and provide the calculated GPS locations to the in-vehicle computer electronic system 510 to identify the absolute GPS location of the target object. The network switch 520 is also configured to receive PTU command/control data and thermal camera command/control data from the in-vehicle computer electronic system 510, transmit the PTU command/control data to one or more of the pan & tilt units in the plurality of pan & tilt units 560-575, and transmit the thermal camera command/control data to one or more of the thermal cameras in the plurality of thermal cameras 540-555.

The details of the vehicular multi-directional thermal camera system described above, by reference to FIGS. 1-5, demonstrate an embodiment of the vehicular multi-directional thermal camera system. Details of another embodiment of the vehicular multi-directional thermal camera system are described next, by reference to FIGS. 6-9.

In particular, and by reference to, FIG. 6 conceptually illustrates a second vehicular multi-directional thermal camera system 600 attached to a vehicle. The second vehicular multi-directional thermal camera system 600 carries out most all of the same functions of the vehicular multi-directional thermal camera system described above, by reference to FIGS. 1-5. However, the second vehicular multi-directional thermal camera system 600 acts as an alternate embodiment with same function in a different form. Specifically, the second vehicular multi-directional thermal camera system 600 shown in this figure includes a vehicle 610, a multi-directional thermal camera base 620, a plurality of thermal cameras 630-660, and a multi-directional thermal camera track 670. Also shown in this figure is an angular position circle 680 with 360° of angular rotational positions at which to set the plurality of thermal cameras 630-660. In addition to the above components, the second vehicular multi-directional thermal camera system 600 includes an in-vehicle computer electronic system, which is not shown in this figure. The in-vehicle computer electronic system of the second vehicular multi-directional thermal camera system 600 is configured to send and receive data as described above, with changes only due to form differences between the second vehicular multi-directional thermal camera system 600 and the vehicular multi-directional thermal camera system described above. Furthermore, the second vehicular multi-directional thermal camera system 600 includes a GPS system which is attached to the multi-directional thermal camera base 620 (but not shown in this figure).

The plurality of thermal cameras 630-660 comprise a first thermal camera 630, a second thermal camera 640, a third thermal camera 650, and a fourth thermal camera 660. Each of these thermal cameras is set to a particular angular position with respect to the angular position circle 680. Specifically, the first thermal camera 630 is set to an angular position of 335°, the second thermal camera 640 is set to an angular position of 205°, the third thermal camera 650 is set to an angular position of 25°, and the fourth thermal camera 660 is set to an angular position of 155°.

In some embodiments, the multi-directional thermal camera base 620 is configured to rotate around the full 360° by rotational commands from the in-vehicle computer electronic system. When the in-vehicle computer electronic system transmits a rotational command to the multi-directional thermal camera base 620, the angular positions of all the thermal cameras in the plurality of thermal cameras 630-660 change equally, according to the amount of rotational movement specified in the rotational command. For instance, if the in-vehicle computer electronic system sends a rotational command to the multi-directional thermal camera base 620 to rotate +15°, then the first thermal camera 630 would be reset to an angular position of 350°, the second thermal camera 640 would be reset to an angular position of 220°, the third thermal camera 650 would be reset to an angular position of 40°, and the fourth thermal camera 660 would be reset to an angular position of 170°.

In addition to making all-encompassing rotational changes to the plurality of thermal cameras 630-660, the second vehicular multi-directional thermal camera system 600 also supports individual rotational changes to individual thermal cameras in the plurality of thermal cameras 630-660. The individual rotational changes to individual thermal cameras would be specified by the in-vehicle computer electronic system issuing a rotational command with a unique identifier (UID) of the individual thermal camera and the amount of rotational movement. For instance, the in-vehicle computer electronic system may send a rotational command to rotate the thermal camera identified by serial number '85902496' by +20°, which would result in identification of the third thermal camera 650 (having serial number '85902496'), thereby causing the third thermal camera 650 to reset the angular position to 45°. Meanwhile, the angular positions of the first thermal camera 630 (335°), the second thermal camera 640 (205°), and the fourth thermal camera 660 (155°) would remain unchanged.

While not shown in this figure, the second vehicular multi-directional thermal camera system 600 also includes a plurality of pan & tilt units that correspond to the plurality of thermal cameras 630-660. Thus, the plurality of pan & tilt units are mounted to the multi-directional thermal camera base 620 and the plurality of thermal cameras 630-660 are mounted to the plurality of pan & tilt units. Similar to the control of the plurality of thermal cameras 630-660, the in-vehicle computer electronic system of the second vehicular multi-directional thermal camera system 600 is configured to command and control the plurality of pan & tilt units. Instead of affecting rotational movements, the in-vehicle computer electronic system issues vertical tilting commands for movement of the plurality of pan & tilt units up and down.

By way of example, FIG. 7 conceptually illustrates an example of measuring and GPS calculation by the second vehicular multi-directional thermal camera system mounted to the track on the roof of the vehicle 700. As shown in this figure, a vehicle is driving down a road or other pathway while the plurality of thermal cameras, attached to the multi-directional thermal camera base, capture radiometric thermography data of a power line pole. The GPS system, also attached to the multi-directional thermal camera base, is highly accurate. When the vehicle is moving, the GPS system calculates multiple locations of the vehicle along its path of movement and, in connection with a known distance from the road/pathway to the power line pole, is able to use triangulation techniques to determine GPS coordinates of the base of the target power line pole. The ability to determine the location of the target object is key because most GPS systems would be installed in a vehicle or on a user's mobile device, but which only provide the exact location of the vehicle or the mobile device. By contrast, the vehicular multi-directional thermal camera system and the second vehicular multi-directional thermal camera system described in this specification are configured to identify the absolute GPS location of the target object by way of known or calculated distances and triangulation techniques with respect to multiple vehicle GPS locations. Furthermore, the multi-directional thermal camera base may be equipped with an image capture device that is configured to capture images in a format that a computer vision system can process to identify objects in the image. In some embodiments, the image capture device is one or more of the thermal cameras. In some embodiments, the image capture device comprises a panoramic camera. In some embodiments, the image capture device comprises a 360° panoramic camera. In some embodiments, the computer vision system comprises an artificial intelligence (AI) engine that is configured to detect objects, identify the type of each detected object, and identify instances of multiple images with the detected object. In some embodiments, multiple images identified with the detected object are utilized in one or more of the triangulation techniques. In some embodiments, the distance between the moving vehicle and the based of the target object (detected object) is determined by calculating a relative distance by triangulating the multiple known GPS locations of the moving vehicle as it travels along the road/pathway to identify the absolute GPS coordinates of the base of the target object. In this figure, for example, the absolute GPS coordinates of the base of the target object (base of power line pole) are calculated to be (X=40.3342375, Y=−105.234334).

By way of example, FIG. 8 conceptually illustrates a perspective view of the second vehicular multi-directional thermal camera system mounted to the track on the roof of a moving vehicle during use to estimate a GPS location of a base object 800. As shown in this figure, the GPS system of the moving vehicle has identified GPS coordinates of the vehicle at each of four locations: GPS X, $Y^1$, GPS X, $Y^2$, GPS X, $Y^3$, and GPS X, $Y^4$. The distances ($d^1$, $d^2$, $d^3$, and $d^4$) from the four vehicle locations to the base of the target object (power line pole) is unknown as are GPS coordinates of the base of the target object (GPS X, $Y^5$). However, once the target object is identified, the AI engine identifies the GPS coordinates for the base of the target object. Specifically, the AI engine calculates the absolute coordinates for GPS X, $Y^5$ based on the intersecting triangulation of the multiple known GPS coordinates for the multiple vehicle locations, namely GPS X, $Y^1$, GPS X, $Y^2$, GPS X, $Y^3$, and GPS X, $Y^4$.

By way of another example, FIG. 9 conceptually illustrates a perspective view of the second vehicular multi-directional thermal camera system mounted to the track on the roof of a moving vehicle to measure the height to a target object based on distance to the object and a calculation of vertical pixels from the base object to the target object 900. As shown in this figure, the distances between the moving vehicle and the base of the target object (power line pole) are determined by triangulating the multiple known GPS locations (GPS X, $Y^1$, GPS X, $Y^2$, GPS X, $Y^3$, and GPS X, $Y^4$) to identify the absolute GPS coordinates of the base of the target object. Additionally, in some embodiment, the distances between the moving vehicle and the base of the target object are determined by calculating a relative distance by a number of pixels to the target object in each of the multiple images with the detected (target) object. In some embodiments, the relative height of the detected (target) object is also determined by a count of a number of pixels from a base of the detected (target) object to a peak height ($h^1$) of the detected (target) object.

Many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of an in-vehicle computing device, a mobile computing device, such as the in-vehicle control and display computing device described above by reference to FIG. 3, or a mobile communication device, such as a smartphone, a hand-held computing device, or a tablet computing device (referred to simply as a "mobile device"), or the processor of a traditional computing device, such as a laptop computer which could be utilized in the vehicle. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

By way of example, FIG. 10 conceptually illustrates an electronic system 1000. The electronic system 1000 shown in this figure may be the in-vehicle control and display computing device or another type of computing device deployed for use in a vehicle with the vehicular multi-directional thermal camera system. Such an electronic system includes various types of computer readable media and interfaces for various other types of computer readable media. As shown in this figure, the electronic system 1000 includes a bus 1005, processing unit(s) 1010, a system memory 1015, a read-only memory 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and various data including PTU data (current configuration settings for each PTU, command data (to change PTU settings, focus cameras, etc.), image data (of base and target objects, to measure pixels for height, etc.), thermographic data (overlaying image data), GPS coordinates (location data), and other data to process in order to execute the processes of the vehicular multi-directional thermal camera system. The processing unit(s) may be a single processor or a multi-core processor in different embodiments.

The read-only-memory (ROM) 1020 stores static data and instructions that are needed by the processing unit(s) 1010 and other modules of the electronic system 1000. The permanent storage device 1025, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1025.

Other embodiments use a removable storage device (such as a floppy disk, an optical disk, a flash drive, or a solid state drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor 1010 needs at runtime. In some embodiments, the invention's processes are stored in the system memory 1015, the permanent storage device 1025, and/or the read-only memory 1020. For example, the various memory units include instructions for triangulating a location of a focal target and estimating distance to the focal target from a moving vehicle, calculating height from a base object of the focal target to a target object of the same focal target based on images of the focal target, performing an artificial intelligence (AI) algorithm to detect anomalies in image/thermographic image data, processing thermographic data associated with the target object, and so forth. From these various memory units, the processing unit(s) 1010 retrieves instructions to execute and data to process in order to execute the processes of some embodiments.

The bus 1005 also connects to the input and output devices 1030 and 1035. The input devices enable the user to communicate information and select commands to the electronic system. The input devices 1030 include alphanumeric keyboards, pointing devices (also called "cursor control devices"), buttons of the in-vehicle control and display computing device, a joystick of the in-vehicle control and display computing device, etc. The output devices 1035 include at least the integrated display screen of the in-vehicle control and display computing device configured to display thermographic images captured by each of the thermographic cameras of the vehicular multi-directional thermal camera system and other images, data, or information generated by the electronic system 1000. The output devices 1035 may also include printers and externally attached display devices, such as liquid crystal displays (LCD) and organic light emitting diode (OLED) displays. Some embodiments include devices such as a touchscreen that functions as both input and output devices.

Finally, as shown in FIG. 10, bus 1005 also couples electronic system 1000 to a network 1040 through a network adapter (not shown). In this manner, the computer can be a part of a network of computers (such as a local area network ("LAN"), a wide area network ("WAN"), or an intranet), or a network of networks (such as the Internet). Any or all components of electronic system 1000 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, many of the drawings conceptually illustrate operations of methods carried out by the vehicular multi-directional thermal camera system. In each case, the specific operations of a method may not be performed in the exact order shown and described. Specific operations may not be performed in one continuous series of operations, and different specific operations may be performed in different embodiments. Furthermore, each method could be implemented using several sub-methods, or as part of a larger macro process or method. Thus, one of ordinary skill in the art would understand that the invention is not to be limited by the foregoing illustrative details, but rather is to be defined by the appended claims.

I claim:

1. A method for capturing radiometric thermography data of an object from a moving vehicle comprising:

automatically capturing, by a plurality of thermal cameras attached to the moving vehicle, radiometric thermography data of an area within respective fields of view of the plurality of thermal cameras while the moving vehicle is in motion;

processing the captured radiometric thermography data by an artificial intelligence (AI) and computer vision system;

identifying a location of a target object by triangulating a geospatial position of the target object based on (i) multiple GPS locations of the moving vehicle and (ii) a relative distance between the moving vehicle and the target object; and processing the radiometric thermography data of the target object to detect anomalies.

2. The method for capturing radiometric thermography data of an object from a moving vehicle of claim 1, wherein the radiometric thermography data comprises temperature data.

3. The method for capturing radiometric thermography data of an object from a moving vehicle of claim 1, wherein processing the captured radiometric thermography data by the AI and computer vision system comprises detecting the target object in a plurality of images of the captured radiometric thermography data.

4. The method for capturing radiometric thermography data of an object from a moving vehicle of claim 1, wherein the relative distance between the moving vehicle and the target object is determined based on a known distance from a roadway to the target object and a position of the moving vehicle.

5. The method for capturing radiometric thermography data of an object from a moving vehicle of claim 1, wherein processing the radiometric thermography data of the target object to detect anomalies is performed by the AI and computer vision system.

6. A vehicular multi-directional thermal camera system comprising:

an in-vehicle electronic recording device that is used in a vehicle to detect anomalies in electrical infrastructure objects;

a plurality of thermal cameras configured to capture radiometric thermography data of areas outside the vehicle while the vehicle is moving and transmit the captured radiometric thermography data to the in-vehicle electronic recording device in realtime, wherein the plurality of thermal cameras are oriented to capture radiometric thermography data in a plurality of different directions; and a global positioning system (GPS) configured to calculate GPS coordinates of multiple locations of the vehicle as the vehicle is moving and transmit the calculated GPS coordinates to the in-vehicle electronic recording device in realtime, wherein the in-vehicle electronic recording device is configured to determine a relative distance between the vehicle and a target object based on the radiometric thermography data and to identify GPS coordinates of the target object by triangulating the GPS coordinates of the multiple locations of the vehicle and the relative distance to the target object.

7. The vehicular multi-directional thermal camera system of claim 6 further comprising a plurality of multi-directional pan & tilt units to which the plurality of thermal cameras are mounted.

8. The vehicular multi-directional thermal camera system of claim 7, wherein the plurality of multi-directional pan & tilt units are mounted to a roof rack attached to a roof of the vehicle.

9. The vehicular multi-directional thermal camera system of claim 8 further comprising a network switch that communicably connects the in-vehicle electronic recording device to the GPS system, the plurality of thermal cameras, and the plurality of multi-directional pan & tilt units.

10. The vehicular multi-directional thermal camera system of claim 9, wherein the in-vehicle electronic recording device is configured to control the plurality of thermal cameras and the plurality of multi-directional pan & tilt units, and to receive the captured radiometric thermography data from the plurality of thermal cameras to identify a target object.

11. The vehicular multi-directional thermal camera system of claim 10, wherein the in-vehicle electronic recording device comprises a computer vision system and an artificial intelligence (AI) engine.

12. The vehicular multi-directional thermal camera system of claim 11, wherein the AI engine utilizes the computer vision system to process radiometric thermography data captured by the thermal cameras and received by the in-vehicle electronic recording device.

13. The vehicular multi-directional thermal camera system of claim 12, wherein the AI engine is configured to calculate the relative distance to the target object based on the radiometric thermography data and a position of the vehicle.

14. The vehicular multi-directional thermal camera system of claim 13, wherein the AI engine is configured to identify the GPS coordinates of the target object by triangulating the GPS coordinates of the multiple locations of the vehicle and the relative distance to the target object obtained at a plurality of positions of the vehicle.

15. The vehicular multi-directional thermal camera system of claim 14, wherein the AI engine is further configured to detect temperature data anomalies in the radiometric thermography data of the target object.

* * * * *